United States Patent [19]

Poag et al.

[11] Patent Number: 4,936,515
[45] Date of Patent: Jun. 26, 1990

[54] COFFEE BEAN DELIVERY AND GRINDING SYSTEM

[75] Inventors: Andrew F. Poag, St. Louis; Franklin D. Newkirk, Florissant, both of Mo.

[73] Assignee: Unidynamics Corporation, New York, N.Y.

[21] Appl. No.: 395,325

[22] Filed: Aug. 17, 1989

[51] Int. Cl.$^5$ .............................................. B02C 7/14
[52] U.S. Cl. ...................................... 241/36; 241/247; 241/259.1; 241/285 A; 241/285 B; 99/280; 99/285; 99/286; 99/287
[58] Field of Search ................. 241/36, 246, 247, 251, 241/259.1, 285 R, 258 A, 285 B; 99/280, 285, 289 R, 286, 287

[56] References Cited

U.S. PATENT DOCUMENTS

| D. 291,896 | 9/1987 | Stover | D 20/5 |
|---|---|---|---|
| 3,208,369 | 3/1963 | Greenly et al. | 99/283 |
| 3,321,809 | 5/1967 | Young | 241/246 X |
| 3,327,615 | 6/1967 | Swan | 99/286 |
| 3,551,164 | 4/1968 | Weaver | 99/65 |
| 3,967,546 | 7/1976 | Cailliot | 99/286 |
| 4,665,808 | 5/1987 | Pulvermuller | 99/285 |
| 4,715,270 | 12/1987 | Harada | 99/289 |
| 4,821,966 | 4/1989 | Ephraim et al. | 241/259.1 X |
| 4,836,460 | 6/1989 | Akazawa | 241/259.1 X |

Primary Examiner—Timothy V. Eley
Attorney, Agent, or Firm—Senniger, Powers, Leavitt and Roedel

[57] ABSTRACT

A coffee bean delivery and grinding system for producing a charge of ground coffee comprising a bin and hopper for storing coffee beans, an auger being at least partially disposed in the bottom of the hopper, and a grinder having grinding wheels driven by a grinder motor. An auger motor is connected to one end of the auger for turning the auger to convey coffee beans from the hopper to the grinder. A control mechanism is provided for operating the grinder motor and the auger motor during the cycle of operation of the system. The end of the auger opposite the motor is located generally in an opening in the grinder housing such that the end of the auger is adjacent the grinding wheels for feeding coffee beans to the grinding wheels upon initiation of rotation of the auger.

16 Claims, 4 Drawing Sheets

COFFEE BEAN DELIVERY AND GRINDING SYSTEM

Background of the Invention

This invention relates to coffee bean grinders, and more particularly to a system for delivering and grinding coffee beans, especially for use in coffee vending machines.

The invention is further concerned with a system for delivering and grinding coffee beans to produce a predetermined charge of ground coffee in a single cycle of operation of the system. Such a system is particularly applicable in a coffee vending machine for grinding coffee beans to brew each cup of coffee dispensed. Reference may be made to the coassigned U.S. Pat. No. 3,446,137, issued May 27, 1969, entitled Hot Beverage Merchandiser, for disclosure of a coffee vending machine of the type to which the present invention is applicable. The quality of coffee provided by a coffee vending machine is significantly improved when the machine stores coffee beans and grinds the beans for brewing each cup of coffee made by the machine, because coffee beans may be stored longer without loss of freshness than pre-ground coffee meal. Presently, vending machines use commercial grinders which retain ground coffee in the grinder after the grinder is cycled. Because of the relatively small amount of coffee required for each cup vended, freshness between consecutive cups can be affected. Commercial grinders also deliver an inconsistent amount of coffee, which results in inconsistent flavor in the final product. Commercial grinders have large, heavy motors which are expensive to purchase and operate and take up a lot of space in a vending machine. The motor drives both the auger and grinder and therefore the rpm of the motor is limited by the relatively slow rotational speed required to operate the auger. The prior art delivery and grinding systems cannot produce the finer grind of a higher speed grinder. The rate of extraction of coffee from a coarser grind is less than that from a finer grind, thus causing the time of the brewing cycle to be increased with the coarseness of the grind delivered to the brewer. Particularly in coffee vending machines it is desirable to reduce the brewing cycle as much as possible as well as to increase the consistency of in the amount of ground coffee in a charge produced in a single cycle of operation.

Summary of the Invention

The present invention overcomes the above-described difficulties and disadvantages of prior art coffee bean grinding and delivery systems, especially those used in coffee vending machines, by providing such a system in which the auger and grinder are driven independently by separate motors, less ground coffee is retained in the grinder after system is cycled, and the grinder is adjustable to vary the coarseness of the grind and the auger can be quickly stopped to prevent jamming of the grinder. These and other advantages and objects of the present invention will be discussed and further described in more detail hereinafter.

In general, the coffee bean delivery and grinding system of this invention comprises a bin for storing coffee beans which feeds into a delivery hopper having bottom and side walls, and an auger having first and second ends which is at least partially disposed in the bottom of the hopper. The auger extends through a first hole in a wall of the hopper for removing the coffee beans from the hopper. The first end of the auger is connected to an auger motor which turns the auger. The system also has a grinder with a housing for grinding means driven by a grinder motor. The housing has an opening for access to the grinding means in which the second end of the auger is generally located for feeding coffee beans to the grinding means upon initiation of rotation of the auger. The system also has control means to operate the auger motor and the grinder motor during the cycle of operation of the machine.

Another embodiment of this invention is a coffee vending machine in combination with the coffee bean delivery and grinding system described above.

Other objects and features of this invention will be in part apparent and in part pointed out hereinafter.

Brief Description of the Drawings

Corresponding reference characters indicate corresponding parts throughout the several views of the drawings.

Detailed Description of a Preferred Embodiment

Figure 1:
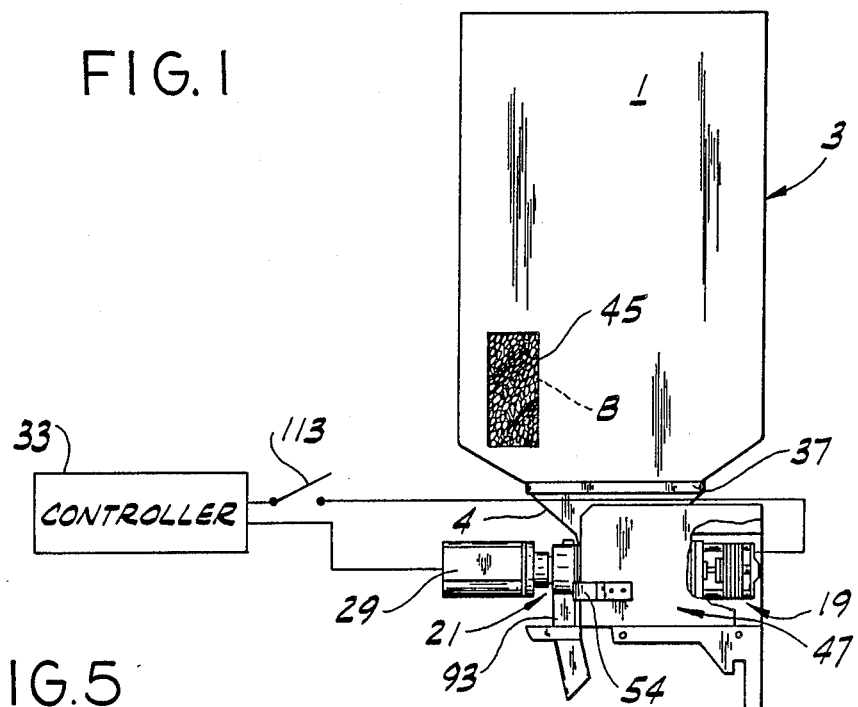
FIG. 1 is a front view of a preferred embodiment of the present invention of a coffee bean delivery and grinding system with parts broken away to show detail.
Figure 2:
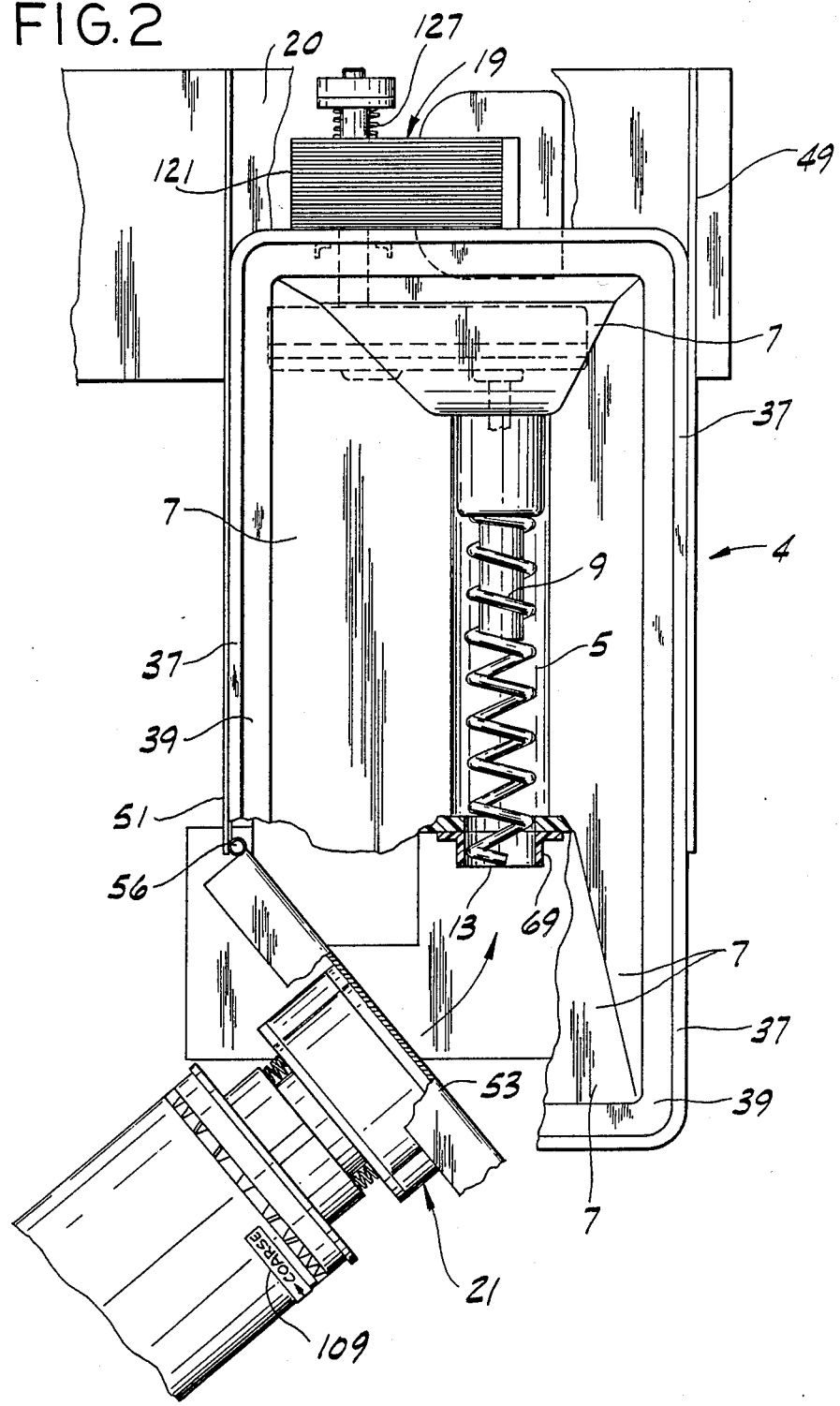
FIG. 2 is an enlarged top view of a portion of the embodiment of FIG. 1 with the bin removed and parts broken away to show detail.
Figure 3:
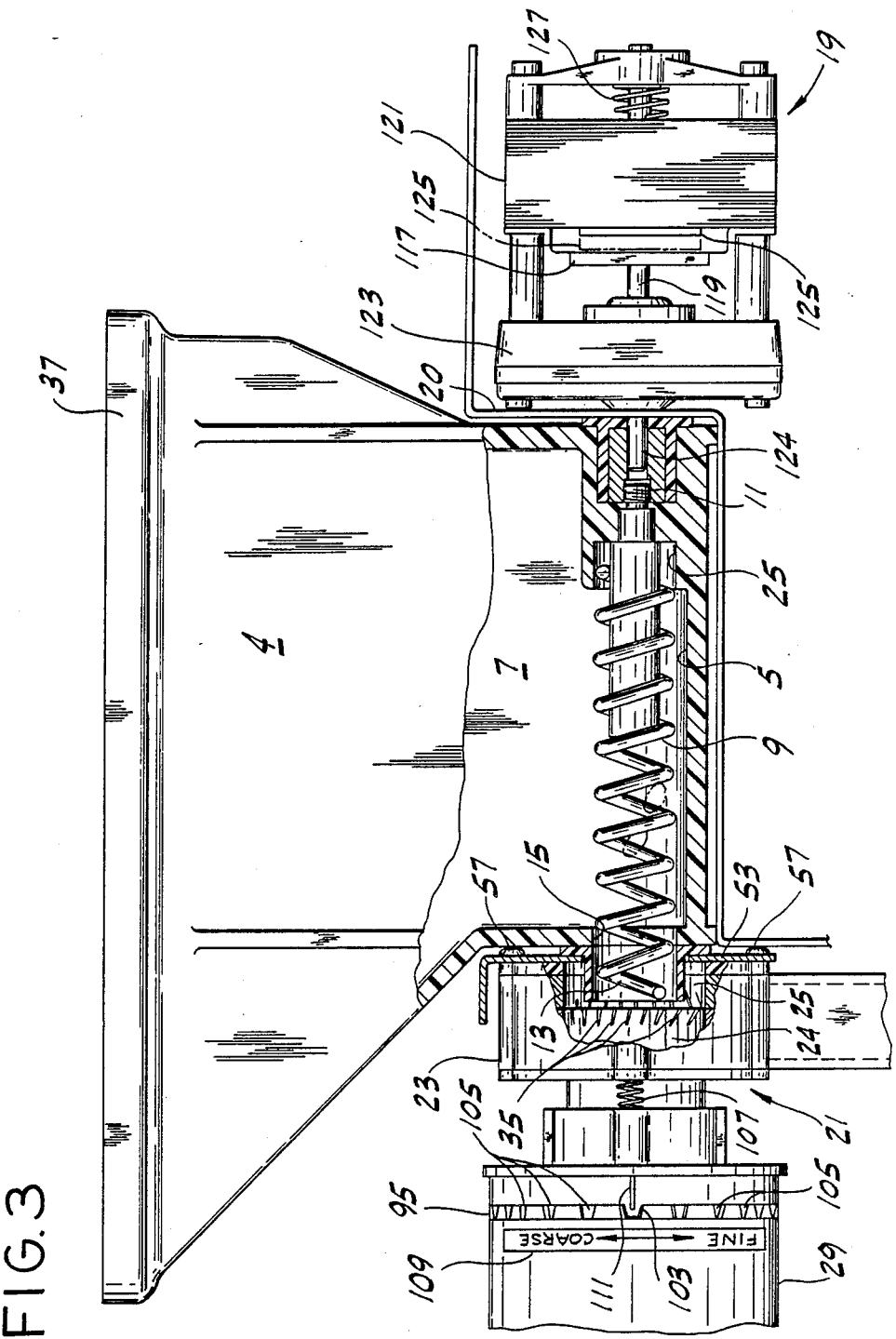
FIG. 3 is an enlarged side view of the embodiment of FIG. 1 with the bin removed and parts broken away to show detail.
Figure 4:
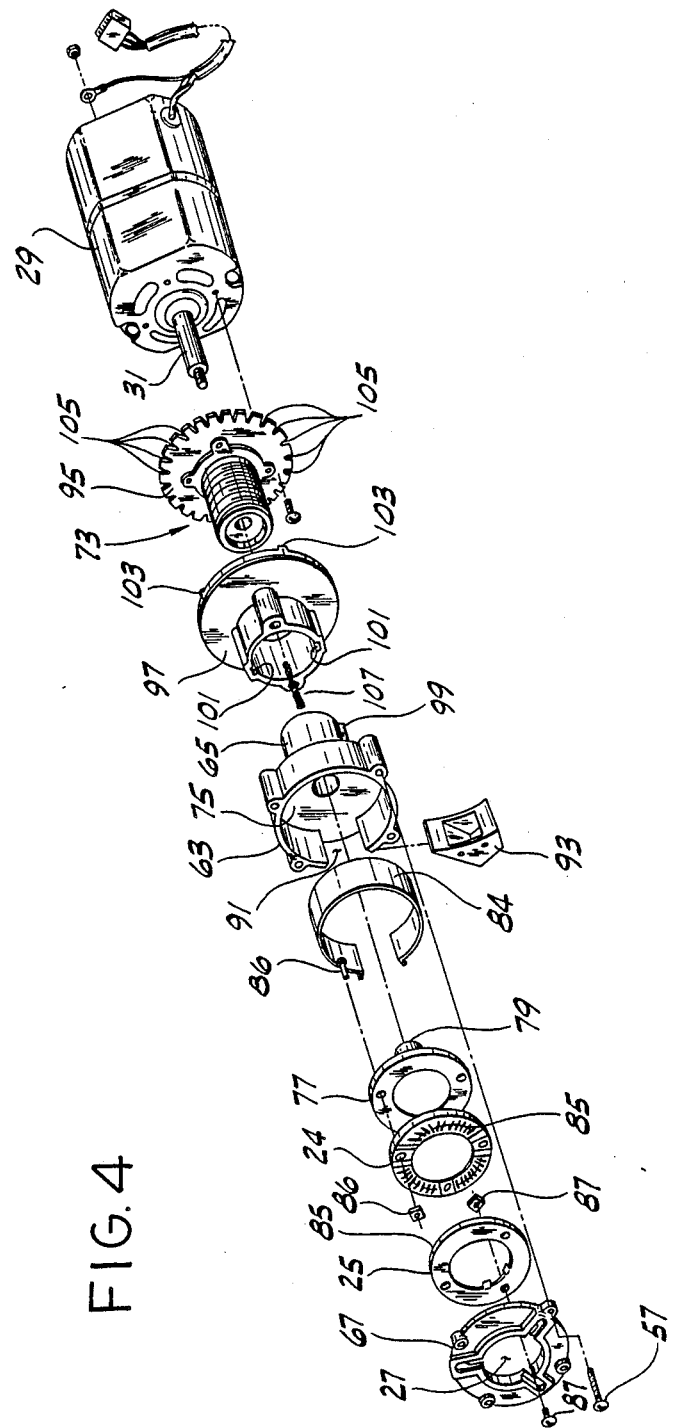
FIG. 4 is an exploded perspective view of the grinder and grinder motor of the preferred embodiment of FIG. 1.

Referring now to the preferred embodiment illustrated in the drawings, a coffee bean delivery and grinding system, indicated generally at 1, for producing a charge of ground coffee in a cycle of operation, includes a bin, indicated generally at 3, for storing coffee beans B. At the base of the bin 3 is a hopper 4 having a bottom wall 5, as shown in FIG. 2, and side walls 7. An auger 9 having first and second ends 11 and 13, as best seen in FIG. 3, is disposed in the bottom of the hopper 4 and extends through a hole 15 in one of the side walls 7 of the hopper for removing coffee beans from the hopper. An auger motor 19, mounted on a frame 20, is connected to the first end 11 of the auger for turning the auger. A grinder, indicated generally at 21 and, as best seen in FIGS. 3 and 4, includes a housing 23 which encloses a grinding means. The grinding means consists of a rotating grinding wheel 24 and a nonrotating grinding wheel 25, both disposed within the housing 23 which is located adjacent the hole 15 in the sidewall 7 of the hopper 3. The housing 23 has an opening 27 which, when the grinding means is in its operative position as shown in FIG. 3, is aligned with the hole 15 for receiving beans from the hopper 4 delivered by the auger 9. The auger 9 has its second end 13 located generally in the opening 27 for feeding coffee beans to the grinding means upon initiation of rotation of the auger. The system also includes a grinder motor 29 having a drive shaft 31 for driving the grinding means, and control means 33, as shown in FIG. 1, for operating the auger motor 19 and the grinder motor during the cycle of operation. The provision of separate motors for the auger and the grinder allows the auger to operate at 200 rpm and the grinder to simultaneously run at 10,000 rpm. As previously mentioned, this is advantageous since a much finer grind of coffee can be achieved much more quickly than with prior art devices and the amount of coffee beans fed to the grinding means by the auger 9 can be more readily controlled because of the separate drive and slower rotation of the auger 9. Because the grinder motor operates at high speed, smaller diameter grinding wheels 24, 25 may be used. A typical grinding wheel of a commercial grinder is approximately three and one-half inches in diameter whereas the grinding wheels 24, 25 of the present invention are one and three-eighths inches in diameter. It is to be understood that the precise diameter of the grinding wheels is not critical to the invention. The smaller grinding wheels 24, 25 have teeth 35 which are spaced closer together than the teeth of a larger grinding wheel. Therefore, retention of ground coffee between the teeth after the delivery and grinding cycle has been completed is reduced, so that the freshness of each charge of ground coffee produced by the delivery and grinding system 1 is maximized.

A curved flange 37 projecting generally outwardly and upwardly from the top of the side walls 7 of the hopper defines a channel 39 for receiving the bottom of the bin. The side walls 7 taper inwardly toward the bottom of the hopper 4 so that coffee beans are guided to the auger 9. A window 45 is provided in the side of bin 3 so that it may be quickly and easily determined when the coffee bean supply is running low.

Around the bin 3 is a frame, generally indicated at 47, having front and back walls 49,51 and a first side wall 53, the walls being disposed on three sides of the bin. The first side wall 53 has an opening 55 which is generally coaxial with the hole 15 in the side wall 7 of the bin and is provided with means, such as screws 57, for mounting the grinder 21 and accompanying grinder motor 29 on the first side wall 53 of the frame such that the opening 27 in the grinder housing 23 is adjacent to and substantially aligned with the opening 55 in the first side wall 53 of the frame 47. The first side wall 53 is pivotally mounted on the back wall 51 and releasably attached by springclip 54 to said front wall 49 so that the first side wall may be unattached from the front wall and swung open about hinge 56 on generally vertical axis, which is substantially in the plane of said back wall, to provide access to the grinding wheels 24,25 and the second end 13 of the auger 9 for cleaning and for removal of the grinder 21 from the frame 47.

As best seen in FIG. 4, the grinder housing 23 includes first and second coaxial tubular portions 63,65 and an annular mounting plate 67. A cylindric cover 69 (FIG. 2) is mounted on the side wall 7 of the bin 3 over the hole 15 and surrounds the auger 9 to prevent the beans B from falling away from the auger once outside the bin. The cover 69 and the second end 13 of the auger pass through the opening in the first side wall 53 of the frame and terminate in the opening 27 in the housing 23. The location of the second end 13 of the auger is such that, once the system has been primed by turning the auger to fill the cover 69 with coffee beans, coffee beans will be immediately force fed to the grinding means upon initiation of rotation of the auger.

The grinder 21 includes a base, indicated at 73, on which the grinder motor 29 is fixedly mounted. The drive shaft 31 of the grinder motor extends through the base 73 and into the second tubular portion 65 of the grinder housing 23. The first tubular portion 63 is of a greater diameter than the second tubular portion 65 and has a wall 75 on its axially inner end to which the second portion is integrally attached. A turntable 77 is received in the first tubular portion 63 and a stem 79 of the turntable extends through an opening in the wall 75 at the inner end of the first tubular portion and mounts on the threaded distal end of the grinder motor drive shaft 31. A liner 84 is placed in the first tubular portion 63 to protect the side wall of the first tubular portion from the abrasive action of the coffee beans as they are ground. The rotary annular grinding wheel 24 is mounted by fasteners 86 on the axially outward face of the turntable 77, with its grinding surface 85 facing axially outward. The rotary grinding wheel 24 is rotated by the grinder motor. The nonrotary annular grinding wheel 25 is connected by fasteners 87 to the annular mounting plate 67 with its grinding surface 85 facing axially inward. The opening through the mounting plate constitutes the opening 27 in the grinder housing for access of the auger 9 to the grinding wheels 24,25. The grinding wheels are thus located substantially coaxially with the grinder housing 23 with their grinding surfaces 85 in face to face relationship with respect to one another.

The grinding wheels 24,25 are axially separated from each other so that the grains of ground coffee beans may escape radially outwardly from the grinding surfaces 85, through a slot 91 in the cylindric side wall of the first tubular portion 63, when they are of a size corresponding to the separation of the grinding wheels. A chute 93 is mounted over the slot 91 in the grinder housing 23 to direct the escaping ground coffee as desired. Means are provided for varying the axial separation of the grinding wheels and thus the coarseness of the grind escaping the wheels (i.e. the larger the separation, the more course the grind). The varying means includes the base 73 of the grinder, and the second tubular portion 65. The base 73 is generally cylindric and has a flange 95 projecting radially outwardly from its axially inner end. The grinder motor 29 is mounted on the flange 95 of the base 73. The second tubular portion 65 is internally threaded for engaging the external threads of the base 23. A releasable locking collar 97 fits around the second tubular portion 65 and is fixed rotationally with respect to the grinder housing 23 by keys 99 (only one is shown) on the external surface of the second portion 65 of the grinder housing 23 which are received in channels 101 in the collar. The collar 97 has tabs 103 which are each received in one of a number of notches 105 located at the radially outer periphery of the flange 95 of the base 73. Two compression springs 107 (only one is shown) bias the collar 97 against the flange 95 to hold the tabs 103 in the notches 105 for fixing the angular position of the base 73 and grinder motor 29 relative to the grinder housing 23. However, the collar 97 may be unlocked, by pushing it away from the base 73 against the force of the springs 107 so that the tabs 103 clear the notches 105, to allow the grinder motor 29 and base 73 to be manually rotated relative to the grinder housing 23. The rotation of the base 73 in the second tubular portion 65 produces, depending upon the direction of rotation, axially inward or axially outward motion of the base, and therefore the grinder motor 29, relative to the grinder housing 23. The turntable 77 and rotary grinding wheel 24 mounted thereon follow the axial movements of the grinder motor 29 because they are connected to the drive shaft 31. Therefore, by turning the base 73 and locking the tabs 103 in different notches 105 of the flange 95, the axial separation of the grinding surfaces 85 of the rotary and nonrotary grinding wheels 24,25 may be set at different distances. A label 109 attached to the grinder motor 29 has a scale marked on it showing a range of grinds generally from course to fine. A raised portion of the locking collar is a pointer 111 which indicates a point on the scale so that the coarseness of the grind may be set by turning the base 73 and grinder motor 29 relative to the locking collar 97 so that the pointer indicates the desired coarseness as indicated on the scale.

In this embodiment, the auger motor and grinder motor are connected in a single electric circuit having switch means 113 controlled by said control means 33 for opening and closing the circuit during the cycle of operation of the delivery and grinding system 1. The auger motor 19 has means associated with it for stopping the rotation of the auger 9 substantially simultaneously with the cut-off of power to the auger motor, to prevent overfeed of coffee beans to the grinder 21. The stopping means in this embodiment is a standard feature of existing electric motors and includes a plate 117 mounted on the auger motor 19 which has a hole in it through which the auger motor drive shaft 119 extends from the core 121 to a gear reduction box 123. Another drive shaft 124 extends from the gear reduction box 123 and is connected to the auger 9. When the stators in the core 121 are energized, the resulting magnetic fields center the rotor 125 in the core as well as inducing its rotation. However, when no power is supplied to the motor, the rotor 125 is biased against the plate by a spring 127 (as shown in phantom in FIG. 3) and frictionally engages the plate to stop rotation of the auger motor drive shaft 119 and thus the rotation of the auger 9 . Absent the stopping feature, the auger 9 tends to rotate after shut off of power to the auger and grinder motors by the control means, causing the grinding wheels 24,25 to become jammed with coffee beans and inoperable to grind them.

Figure 5:
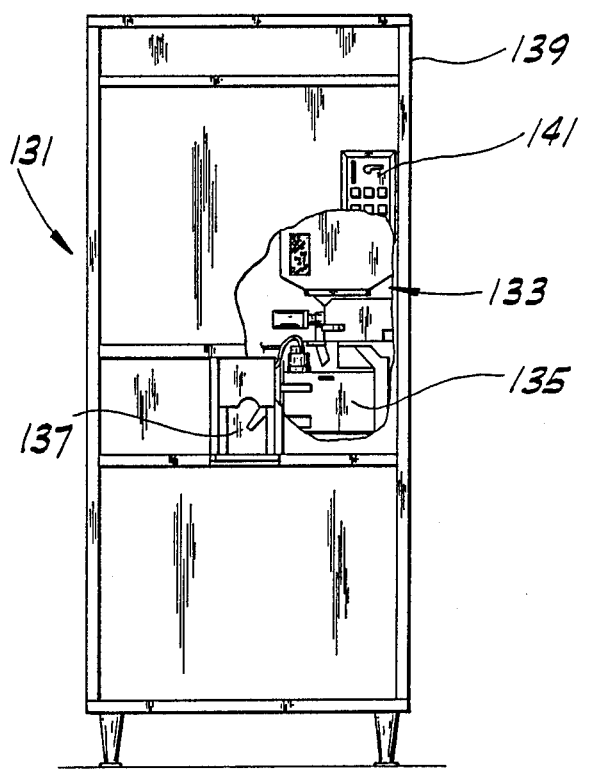
FIG. 5 a front view of a coffee vending machine incorporating the bean grinding and delivery system of FIG. 1, with part of the cabinet broken away to show the coffee bean delivery and grinding system.

In another embodiment, a coffee vending machine of this invention, generally indicated at 131 in FIG. 5, includes the coffee bean delivery and grinding system, generally indicated at 133, described above. In addition, there is provided apparatus 135 for brewing the coffee ground by the grinder and means 137 for dispensing brewed coffee from the brewing device into a container. A cabinet 139 houses the grinding system 133, brewing apparatus 135 and dispensing means 137. A currency operated control means 141 associated with the cabinet 139 initiates operation of the machine to grind, brew and deliver the coffee to a container upon insertion of a predetermined amount of currency. Because the auger and grinder motors run simultaneously, they may be connected in the same circuit in the machine which simplifies the electronics of the machine.

It is also within the scope of this invention to provide a second delivery and grinding system in a single vending machine so that a second type of coffee bean, such as decaffeinated coffee beans, is made available. To facilitate the use of two coffee bean grinders in a single vending machine, the chute 93 may be mounted on the grinder housing 23 is two positions for either directing the charge generally down beneath the grinder housing (as shown in FIG. 4), or for directing the charge laterally outward from the grinder housing. Thus the pair of grinding and delivery systems may deliver ground coffee to a single brewing apparatus.

In operation, the bin 3 is filled with coffee beans B. The level of coffee beans remaining in the bin may be thereafter quickly ascertained by viewing the beans through the window 45 in the bin. A window (not shown) in the cabinet 139 allows the customer to observe the beans and their motion as they are dispensed to the grinder during the brewing cycle. Initially, system is primed by rotating the auger 9 to convey coffee beans to the second end 13 of the auger and to the end of the cylindric cover 69, surrounding the auger outside of the bin, adjacent the grinding wheels 24,25 in the grinder 21. Thereafter, when the control means 33 initiates operation of the grinder motor 29 and auger motor 19, the auger 9 force feeds coffee beans directly to the grinding wheels 24, 25. The auger will deliver very nearly the same amount of coffee beans to the grinding wheels in each cycle of operation. The location of the second end of the auger and the provision of separate motors for substantially simultaneous delivery and grinding of coffee beans operate to make the amount of coffee ground in each charge produced consistent over an indefinite number of cycles of operation of the system. The separate, high speed grinder motor allows smaller diameter grinding wheels having teeth spaced more closely together to be used, which prevents retention of ground coffee in the grinder after the cycle of operation of the delivery and grinding system. In addition, the use of separate motors allows a simplification of the circuitry of the vending machine into which the system is incorporated because the grinder and auger motors to be connected in the same circuit for simultaneous operation during a cycle of the machine. The coffee beans delivered to the grinding wheels are ground by the grinder to a coarseness corresponding to the axial separation of the grinding wheels. The grind then escapes the grinding wheels through a slot 91 in the wall of the grinder housing 23 and is directed by the chute 93 to brewing apparatus 135. The coarseness of the coffee ground by the grinder may be varied by releasing the tabs 103 of the collar 97 from the notches 105 in the base 73 of the grinder and turning the grinder motor and base to increase or decrease the axial separation of the grinding wheels. After brewing, the coffee is received in the dispensing means 137 for delivery to a container for consumption by the customer.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A coffee bean delivery and grinding system for producing a charge of ground coffee in a cycle of operation, the system comprising,
   a bin for storing coffee beans,
   a hopper for receiving beans from the bin and having bottom and sidewalls,
   an auger mounted for rotation within the hopper and having first and second ends, the auger being at least partially disposed in a bottom portion of the hopper and extending through a hole in a side wall of the hopper for removing coffee beans from the hopper, an auger motor connected to said first end of the auger for rotating the auger, a grinder including a housing and a grinding means disposed within the housing, the housing having an opening for access to said grinding means, said second end of the auger being located generally in said opening for feeding coffee beans to the grinding means upon initiation of rotation of the auger, a grinder motor having a drive shaft for driving by engaging the grinding means, and control means for operating the auger motor and the grinder motor during a cycle of operation.

2. The coffee bean delivery and grinding system as set forth in claim 1 further comprising means for stopping rotation of the auger substantially simultaneously with the cut-off of power to the auger motor to prevent overfeed of coffee beans to the grinder.

3. The coffee bean delivery and grinding system as set forth in claim 1 wherein the auger is rotated at a substantially slower speed than the grinder motor drive shaft during a cycle of operation.

4. The coffee bean delivery and grinding system, as set forth in claim 1, further comprising means for adjusting the grinding means to vary the coarseness of the coffee ground by it.

5. The coffee bean delivery and grinding system as set forth in claim 4 wherein, the grinder housing is adapted to receive the grinder motor drive shaft therein, the grinding means includes first and second grinder wheels, each said grinder wheel having a grinding surface, said grinder wheels being disposed in said grinder housing with their grinding surfaces in face to face relation with one another, said grinding surfaces being separated from each other so that ground coffee may escape from the grinding surfaces when the coffee beans are ground to a size corresponding to the separation of the grinding surfaces, and the grinder is adapted for variation of the separation of said grinding surfaces.

6. The coffee bean delivery and grinding system, as set forth in claim 5, further comprising scale means showing a range of grinds generally from coarse to fine thereon, and pointer means for indicating a point on the scale corresponding to the coarseness of the grind produced by the delivery and grinding system in a cycle of operation, said pointer means and said scale means being adapted for motion relative to each other as the separation of the grinding surfaces is varied whereby the point indicated on said scale means corresponds to the separation of the grinding surfaces.

7. The coffee bean delivery and grinding system, as set forth in claim 5, further comprising a single electric circuit supplying power to the auger motor and the grinder motor, and switching means for closing and opening the circuit during the cycle of operation of the system, said switching means being controlled by said control means whereby the auger motor and the grinder motor run substantially simultaneously during the cycle of operation of the system.

8. The coffee bean delivery and grinding system, as set forth in claim 1, further comprising a frame having front and back walls and first and second side walls, the walls being disposed in a rectangle around the hopper, the front wall having a hole therethrough and means for mounting the grinder thereon so that the opening in the grinder housing is adjacent to and substantially aligned with said hole in the front wall, the front wall being pivotally mounted on said first side wall and releasably attached to said second side wall whereby the front wall may be unattached from said second side wall and swung open about a generally vertical axis which is substantially in the plane of said first side wall for access to the grinding means and said second auger end.

9. A coffee vending machine comprising, a bin for storing coffee beans, a hopper for receiving beans from the bin and having bottom and side walls, an auger mounted for rotation within the hopper and having first and second ends, the auger being at least partially disposed in a bottom portion of the hopper and extending through a hole in a side wall of the hopper for removing coffee beans from the hopper, an auger motor connected to said first end of the auger for rotating the auger, a grinder including a housing and a grinding means disposed within the housing, the housing having an opening for access to said grinding means, said second end of the auger being located generally in said opening for feeding coffee beans to the grinding means upon initiation of rotation of the auger, a grinder motor having a drive shaft for driving by engaging the grinding means, control means for operating the auger motor and the grinder motor during a cycle of operation, brewing apparatus for brewing coffee ground by the grinder, means for dispensing brewed coffee from the brewing apparatus into a container, a cabinet for housing the bin, motors, brewing device and dispensing means, and currency operated control means associated with the cabinet for initiating operation of the vending machine to grind, brew and deliver the coffee to a container upon insertion of a predetermined amount of currency.

10. The coffee vending machine as set forth in claim 9 further comprising means for stopping the rotation of the auger substantially simultaneously with the cut-off of power to the auger motor to prevent overfeed of coffee beans to the grinder.

11. The coffee vending machine, as set forth in claim 10, further comprising a frame having front and back walls and first and second side walls, the walls being disposed in a rectangle around the hopper, the front wall having a hole therethrough and means for mounting the grinder thereon so that the opening in the grinder housing is adjacent to and substantially aligned with said hole in the front wall, the front wall being pivotally mounted on said first side wall and releasably attached to said second side wall whereby the front wall may be unattached from said second side wall and swung open about a generally vertical axis which is substantially in the plane of said first side wall for access to the grinding means and said second auger end.

12. The coffee vending machine, as set forth in claim 9, further comprising means for adjusting the grinding means to vary the coarseness of the coffee ground by it.

13. The coffee vending machine as set forth in claim 12 wherein, the grinder housing is adapted to receive the grinder motor drive shaft therein, the grinding means includes first and second grinder wheels, each said grinder wheel having a grinding surface, said grinder wheels being disposed in said grinder housing with their grinding surfaces in face to face relation with one another, said grinding surfaces being separated from each other so that ground coffee may escape from the grinding surfaces when the coffee beans are ground to a size corresponding to the separation of the grinding surfaces, and the grinder is adapted to vary the separation of said grinding surfaces.

14. The coffee vending machine, as set forth in claim 13, further comprising scale means showing a range of grinds generally from coarse to fine thereon, and pointer means for indicating a point on the scale corresponding to the coarseness of the grind produced by the delivery and grinding system in a cycle of operation, said pointer means and said scale means being adapted for motion relative to each other as the separation of the grinding surfaces is varied whereby the point indicated on said scale means corresponds to the separation of the grinding surfaces.

15. The coffee vending machine, as set forth in claim 13, further comprising a single electric circuit supplying power to the auger motor and the grinder motor, and switching means for closing and opening the circuit during the cycle of operation of the system, said switching means being controlled by said control means whereby the auger motor and the grinder motor run substantially simultaneously during the cycle of operation of the system.

16. The coffee vending machine as set forth in claim 9 wherein the auger is rotated at a substantially slower speed than the grinder motor drive shaft during the cycle of operation.

* * * * *